Sept. 14, 1965   M. R. JOSEPH   3,205,689
APPARATUS FOR FORMING METAL
Filed Oct. 8, 1962
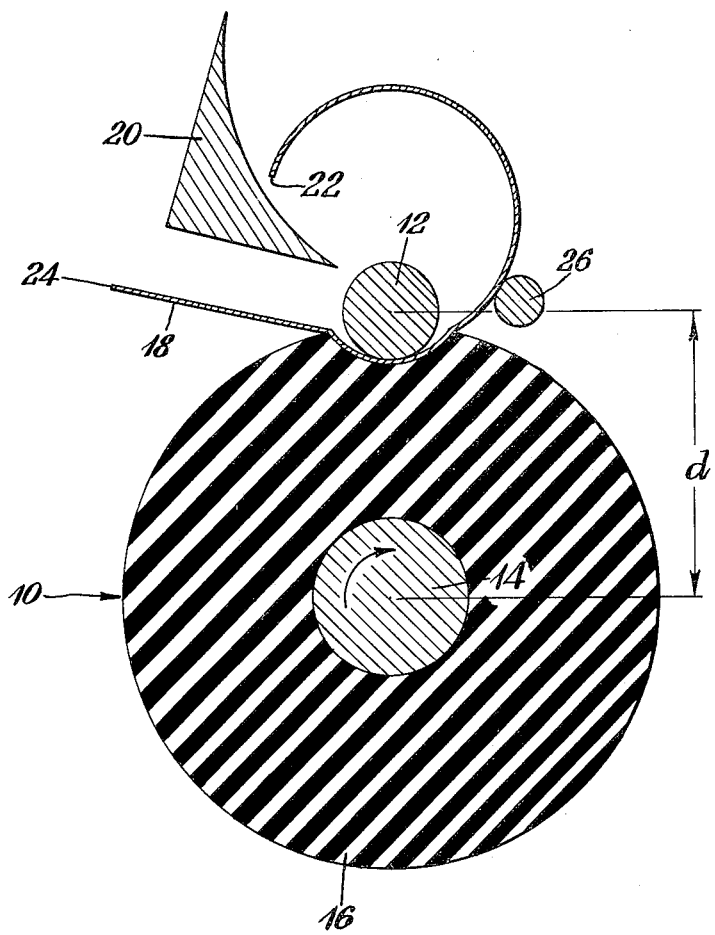
INVENTOR.
MAURICE R. JOSEPH
BY *John R. Roberts*
ATTORNEY 3,205,689
APPARATUS FOR FORMING METAL
Maurice R. Joseph, Fremont, Ohio, assignor to Union
Carbide Corporation, a corporation of New York
Filed Oct. 8, 1962, Ser. No. 229,054
1 Claim. (Cl. 72—146)

This invention relates to an apparatus for forming metal, and it refers more particularly to an apparatus which forms tubular shaped objects and the like from metallic stock.

Tubular shaped objects have many uses in industry and serve, for example, as pipes, housings, structural members for various equipment, and the like. A principal application for tubular shaped objects is in the battery field wherein it is desirable to manufacture inexpensively thin-walled cylindrically shaped containers having a longitudinal butt seam.

It is, therefore, the principal object of the invention to provide an apparatus for fabricating tubular shaped objects from metallic sheet stock.

It is another object to provide an apparatus which will form tubular shaped objects of any desired diameter.

It is a further object to provide an apparatus which is adaptable to manual, semi-automatic or automatic operation.

These and other objects are achieved by the apparatus of the invention which comprises parallel rollers, a resilient material disposed therebetween such that the center to center distance between the rollers is less than the sum of their radii and the thickness of the material. By driving the rollers and feeding a piece of metallic stock through said rollers a tubular shaped object is formed.

In order that the invention may be more readily understood, reference is made to the drawing in which the sole figure is a cross-sectional view schematically showing the apparatus of the invention.

Referring now to the drawing, there is shown a pair of rollers, both of which may be driven together. As shown in the drawing by the arrow, the driver is roller 10 and roller 12 is a rigid pressure roller. The drive roller 10 is comprised of an underlying roller 14 provided with a rubber covering 16 suitably adhered thereto. The center to center distance ($d$) between the rollers 10 and 12 is adjustable as desired by varying the amount of interference between them, such that the rubber covering 16 is maintained under compression by the roller 12. There is also illustrated in the drawing metallic sheet stock or a blank 18 being fed through rollers 10 and 12 and shown emerging from the opposite side thereof as a partially curled tube. When the blank 18 is completely fed through the apparatus of the invention, it emerges shaped as a butt seam tube.

A skip bar 20 serves to divert the leading edge 22 of the tube being curled over the top of roller 12 and away from the feed position so that it will not pass through the rollers 10 and 12 a second time. The curled tube is not deformed in any way by this action since the diameter of the roller 12 is smaller than the curled tube diameter. The use of a skip bar 20 is particularly preferred when it is desired to fabricate tubes having a slight overlap, that is, causing the leading edge 22 to be overlapped by the trailing edge 24 of the blank 18. It should be apparent that the skip bar 20 need not necessarily be of a fixed curved design, in fact it can be a single roller or a set of rollers.

In the operation of the apparatus of the invention, a plurality of flat thin sheet blanks suitably lithographed on one side thereof and cut to size are supported by a standard type of feeding device (not shown) and are subsequently fed one at a time along the feed plane of the apparatus until the leading edge of each blank touches the rubber covered roller 10. The blank is positioned such that the lithographed surface faces the rubber covering in order that it is not marred. The blank is then carried into the "bite" zone and into contact with roller 12. The feed plane is suitably adjustable and the angle of feed is the angle formed by the plane in which the blanks are fed at its intersection point with an imaginary horizontal plane tangent to the rollers at the line of contact when they are adjusted to just touch.

The angle of feed can vary depending upon the thickness of the blank and upon the material from which the blank is made. Smaller angles are satisfactory for stiff materials and larger angles appear suitable for more ductile blanks. If it is desired, a feeding device can be adapted to assist the blanks between the rollers. The speed (r.p.m.) of the rollers is generally not a limiting factor in the operation of the apparatus and it can be adjusted to produce any number of tubes per minute. If desired, the speed (r.p.m.) of the rollers 10 and 12 may be phase synchronized with the feeding device such that as soon as the trailing edge of each blank emerges from between the rollers 10 and 12 a new blank is fed into them. Feed rates of 87 pieces per minute and a drive roll speed of 87 r.p.m. have been successfully employed.

As each blank is driven through the rollers 10 and 12, the pressure between the rollers 10 and 12, or in other words the amount of interference between them, will cause the blank to assume a uniform curvature upon emerging from between the rollers 10 and 12. It should be apparent that other factors also contribute to determining what size tube diameter will be fabricated in the operation of the apparatus. For example, soft rubber, thick rubber, small diameter rubber covered roller, large diameter mating roller, stiff and rigid blank material, light pressure between rollers all tend to yield larger diameter tubes. On the other hand, a reversal of these parameters tend to yield smaller diameter tubes.

In the preferred practice of the invention, a third free-turning roller 26 may be utilized to aid in setting up and adjusting the apparatus so that it will fabricate and reproduce the same size tubes made during previous operation. In order to do this, the free-turning roller 26 is disposed parallel to and near the exit of the rollers 10 and 12. The roller 26 is positioned according to a calibration made on a predetermined scale or index, and the pressure roller 12 is adjusted to a "$d$" dimension such that an emerging tube just misses or touches the third roller 26. When in operation, the third roller 26 also serves as a check on the diameter of the tubes being formed.

The rubber covering 16 secured to the underlying roller 14 is suitably a live gum rubber, die rubber or neoprene. A durometer range of from about 50 to 75 is suitable for forming various diameter tubes of different thickness and materials. The thickness of the rubber covering 16 may be as thick as necessary in order to accommodate interchangeable pressure rollers of various diameters. Perfectly, the thickness of rubber on the underlying roller 14 should be at least twice the diameter of the pressure roller. The outer diameter of the rubber covered roll should also be about six times greater than the diameter of the largest diameter pressure roll to be used with it. Using a 0.180 inch diameter pressure roller and a 1.188 inch diameter rubber covered roller, tubes ranging from about 0.55 to 1.29 inches in diameter have been fabricated.

It should be obvious that non-cylindrical tubes could also be made by using a cam to vary the pressure during rotation, using a non-cylindrical underlying roller, or by varying the thickness or hardness of the rubber around the underlying roller.

The length of the rollers 10 and 12 should be slightly longer than the widest blank to be fed through them. This is desirable in order to minimize any deflections which may occur in the roller. Of course, if it is desired, the pressure roller may be backed up by another roller or by other means. Accordingly, the pressure roller may be made of tungsten carbide because of its rigidity.

It should be appreciated that although the present invention has been described with reference to specific embodiments, various changes and modifications will be apparent to those skilled in the art; for example, shorter blanks could be utilized to make partial cylinders, troughs and the like. In addition, a rubber belt backed up by an underlying roller could be used in lieu of a rubber covered roller.

Another modification that will be apparent, for example, is that it is possible to dispose the rollers at suitable angles so as to produce conical shaped objects.

What is claimed is:

An apparatus for bending a metallic stock into a cylindrical form comprising a pair of rollers disposed parallel and adjacent to each other, a resilient covering secured to the surface of one of said rollers, the other of said rollers being of a diameter less than the outside diameter of said covered roller, the center to center distance between said rollers being less than the sum of their radii and the uncompressed thickness of said covering, means for driving said rollers thereby imparting a uniform curvature to said stock which is fed between said rollers, means for precluding the leading edge of said stock from re-entering said rollers, whereby said stock material as it is formed drops free from said rollers upon being drawn therethrough and a free-turning roller disposed near the exit of said rollers so as to aid in gauging the diameter of said cylinders being formed.

References Cited by the Examiner

UNITED STATES PATENTS

| | | | |
|---|---|---|---|
| 378,707 | 2/88 | Miller et al. | 153—54 |
| 2,719,562 | 10/55 | Beegle | 153—54 |
| 2,769,477 | 11/56 | Neer | 153—54 |

CHARLES W. LANHAM, *Primary Examiner.*